US011062359B2

(12) United States Patent
Watson et al.

(10) Patent No.: US 11,062,359 B2
(45) Date of Patent: Jul. 13, 2021

(54) DYNAMIC MEDIA CONTENT FOR IN-STORE SCREEN EXPERIENCES

(71) Applicant: Disney Enterprises, Inc., Burbank, CA (US)

(72) Inventors: Scott Frazier Watson, Marina del Rey, CA (US); Nitzan Katz, Valley Village, CA (US); Lanny S. Smoot, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 196 days.

(21) Appl. No.: 15/660,465

(22) Filed: Jul. 26, 2017

(65) Prior Publication Data

US 2019/0034972 A1    Jan. 31, 2019

(51) Int. Cl.
*G06Q 30/02* (2012.01)
*H04W 4/02* (2018.01)
*H04W 88/02* (2009.01)

(52) U.S. Cl.
CPC ..... *G06Q 30/0269* (2013.01); *G06Q 30/0261* (2013.01); *H04W 4/023* (2013.01); *H04W 88/02* (2013.01)

(58) Field of Classification Search
CPC .......... G06Q 30/0269; G06Q 30/0261; H04W 4/023; H04W 88/02
See application file for complete search history.

(56) References Cited

U.S. PATENT DOCUMENTS

| | | | |
|---|---|---|---|
| 8,307,392 B2 | 11/2012 | Ahanger et al. | |
| 8,457,661 B2 | 6/2013 | Rossano et al. | |
| 8,639,714 B2 | 1/2014 | van Zwol | |
| 8,655,718 B2 | 2/2014 | Athsani et al. | |
| 9,032,297 B2 | 5/2015 | Lovejoy et al. | |
| 9,066,200 B1 | 6/2015 | Loxam et al. | |
| 9,502,073 B2 | 11/2016 | Boiman et al. | |
| 9,936,249 B1* | 4/2018 | Nelson | G06Q 30/0201 |
| 2006/0251383 A1 | 11/2006 | Vronay et al. | |
| 2010/0169906 A1 | 7/2010 | Takahashi | |
| 2011/0098108 A1 | 4/2011 | Kuper et al. | |
| 2012/0166920 A1 | 6/2012 | Abujbara | |

(Continued)

FOREIGN PATENT DOCUMENTS

WO    2013063745 A1    5/2013

OTHER PUBLICATIONS

"Birthday Celebrations will be different in 2016" (Supplied by Applicant, also available at: https://medium.com/@Sercan/birthday-celebrations-will-be-different-in-2016-e7ef16383bb3) (Year: 2016).*

(Continued)

*Primary Examiner* — Katherine Kolosowski-Gager
(74) *Attorney, Agent, or Firm* — Patterson + Sheridan, LLP

(57) ABSTRACT

Systems, methods, and computer program products for performing an operation comprising detecting a first mobile device within a predefined proximity of a display device, receiving profile data from the first mobile device, identifying at least one rule for selecting media content based on the profile data, selecting, based on the at least one rule applied to the profile data, a first item of media content of a plurality of items of media content, and outputting the first item of media content for display on the display device.

18 Claims, 10 Drawing Sheets

(56) References Cited

U.S. PATENT DOCUMENTS

| | | |
|---|---|---|
| 2012/0324491 A1 | 12/2012 | Bathiche et al. |
| 2013/0159445 A1 | 6/2013 | Zonka et al. |
| 2014/0006152 A1* | 1/2014 | Wissner-Gross ............................ G06Q 30/0269 705/14.53 |
| 2014/0095504 A1 | 4/2014 | Soroushian |
| 2015/0318020 A1 | 11/2015 | Pribula |
| 2016/0370975 A1* | 12/2016 | Collins ............... G06F 3/04842 |
| 2017/0025153 A1 | 1/2017 | Svendsen et al. |
| 2017/0069124 A1* | 3/2017 | Tong ....................... G06T 13/40 |
| 2018/0329511 A1* | 11/2018 | Aman ................ G06F 3/03542 |

OTHER PUBLICATIONS

PR Newswire Association LLC, "Birthday Celebrations Will Be Different in 2016", Jan. 26, 2016, 3 pages.

\* cited by examiner

DYNAMIC MEDIA CONTENT FOR IN-STORE SCREEN EXPERIENCES

BACKGROUND

Field of the Invention

The present disclosure relates to in-store screen experiences, and more specifically, to dynamically selecting media content for in-store screen experiences.

Description of the Related Art

It is a challenge to engage visitors to retail establishments, as thousands of people may visit a given location every day. For example, a video for a specific toy may engage some users, but many others may not be interested in that particular item. Often, more tailored content is the only way to engage specific users or groups of users. Therefore, there is a need for solutions that engage as many users as possible.

SUMMARY

In one embodiment, a method comprises detecting a first mobile device within a predefined proximity of a display device, receiving profile data from the first mobile device, identifying at least one rule for selecting media content based on the profile data, selecting, based on the at least one rule applied to the profile data, a first item of media content of a plurality of items of media content, and outputting the first item of media content for display on the display device.

In another embodiment, a computer program product comprises a non-transitory computer-readable storage medium having computer-readable program code embodied therewith, the computer-readable program code executable by a processor to perform an operation comprising detecting a first mobile device within a predefined proximity of a display device, receiving profile data from the first mobile device, identifying at least one rule for selecting media content based on the profile data, selecting, based on the at least one rule applied to the profile data, a first item of media content of a plurality of items of media content, and outputting the first item of media content for display on the display device.

In another embodiment, a system comprise one or more computer processors and a memory containing a program which when executed by the processors performs an operation, the operation comprising detecting a first mobile device within a predefined proximity of a display device, receiving profile data from the first mobile device, identifying at least one rule for selecting media content based on the profile data, selecting, based on the at least one rule applied to the profile data, a first item of media content of a plurality of items of media content, and outputting the first item of media content for display on the display device.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide techniques to dynamically select relevant media content for outputting in retail establishments. Generally, embodiments disclosed herein leverage one or more of user recognition, device recognition, object recognition, user profiles, biometric data, user-generated media content, live media content, and stored media content to dynamically select media content that is most relevant to one or more users in the retail establishment. For example, embodiments disclosed herein may determine that a customer in a retail store is browsing items related to a specific character. As such, embodiments disclosed herein may identify a video of the character, and dynamically select the video for outputting on a display in the store. Furthermore, embodiments disclosed herein may modify and/or enhance the video with user-specific features. For example, embodiments disclosed herein may add an image of the user to the video, giving the appearance that the user is in the video with their favorite character. As another example, the modified video may depict the user wearing clothing associated with the character.

Figure 1:
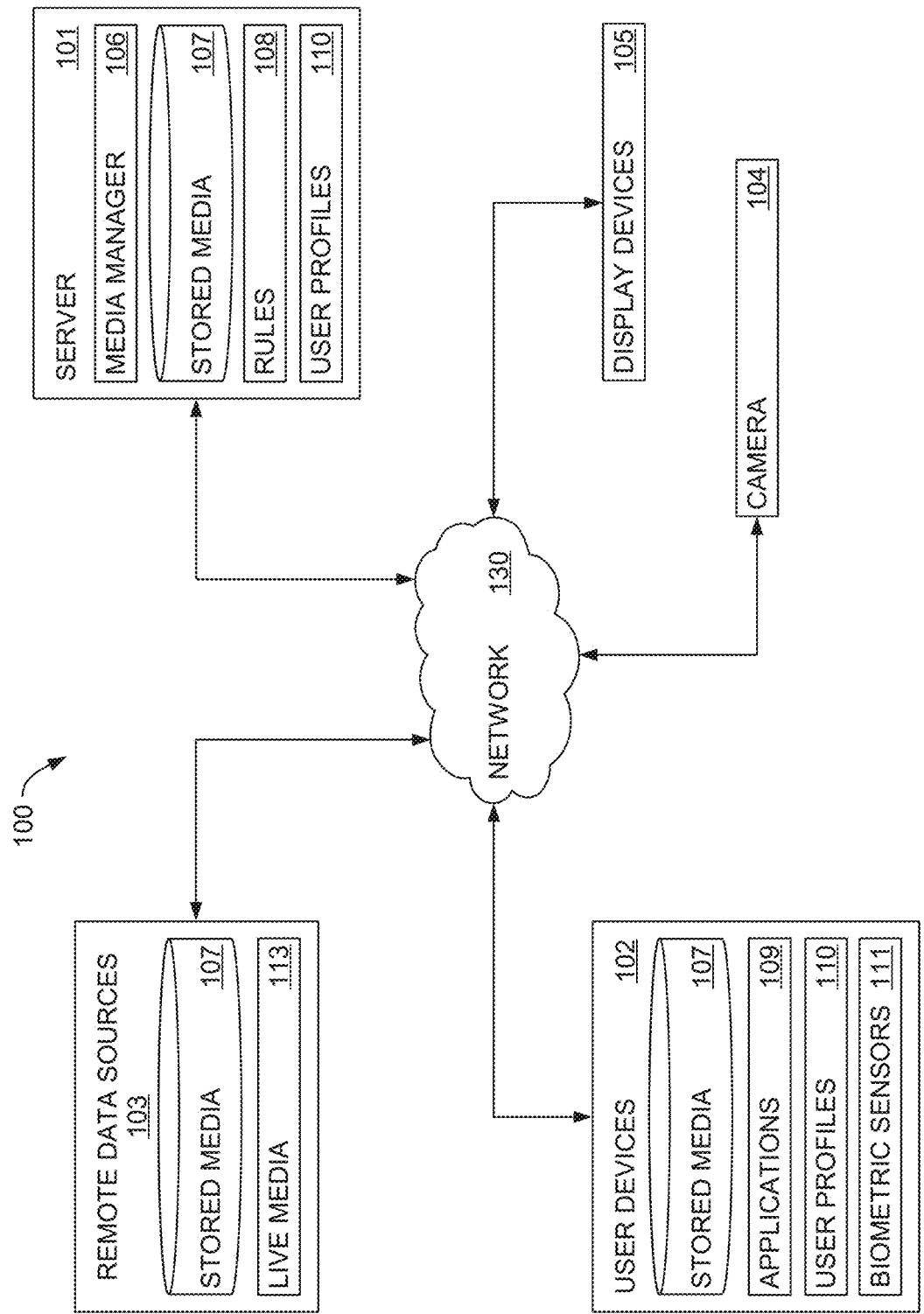
FIG. 1 illustrates a system architecture which provides dynamic media content for in-store experiences, according to one embodiment.

FIG. 1 illustrates a system architecture 100 which provides dynamic media content for in-store experiences, according to one embodiment. As shown, the system 100 includes a server 101, a plurality of user devices 102, a plurality of remote data sources 103, a plurality of cameras 104, and one or more display devices 105 communicably coupled via a network 130. As shown, the server 101 includes a media manager 106, a data store of stored media 107, a data store of rules 108, and a plurality of user profiles 110. The media manager 106 is an application configured to dynamically select relevant media content and output the on one or more output devices, such as the display devices 105. The stored media 107 includes videos, images, and audio files. In some embodiments, the stored media 107 includes user-submitted media content that has been approved for display based on one or more rules in the rules 108. The rules 108 include rules for selecting, modifying, approving, and outputting relevant media content on the display devices 105. The user profiles 110 include profile data for a plurality of users, which may reflect user preferences, avatars, account information for various applications and/or services, and the like.

As shown, the user devices 102 include an instance of the stored media 107, a plurality of applications 109, user profiles 110, and a plurality of biometric sensors 111.

Generally, the user devices 102 are representative of any type of computing device, such as a smartphone, tablet, portable gaming device, wearable computing device, and the like. The stored media 107 on the user devices 102 includes media captured and/or stored by the user (not pictured) on the respective user device 102. The applications 109 are representative of any type of application, such as video games, social media applications, shopping applications, loyalty applications, and the like. The instance of the user profiles 110 on the user devices 102 store user profile data for one or more users, including profile data for the applications 109. The biometric sensors 111 are representative of any type of sensor which monitors a biometric attribute of the user, such as heartrate sensors, blood pressure sensors, temperature sensors, perspiration sensors, and the like.

The remote data sources 103 are representative of any type of data source, such as social media platforms, networked audio/video sources, media hosting services, web services, and the like. As shown, the remote data sources 103 include an instance of stored media 107 and one or more sources of live media 113. The live media 113 is representative of any multimedia content broadcasted in real time, such as a live video feed of a theme park.

In at least one embodiment, the cameras 104 and the display devices 105 are located in a retail establishment. The cameras 104 are representative of any type of imaging device, including image capture devices, devices that can detect objects, and/or devices that can sense movement. In at least one embodiment, the cameras 104 include microphones (not pictured) that capture audio. The display devices 105 are representative of any type of display device, such as a monitor, projection screen, television, and the like. In at least one embodiment, the display devices 105 are three-dimensional (3D) devices configured to output stereoscopic images, such that the output appears to be in three dimensions from the perspective of the user (e.g., while the user is wearing 3D glasses).

As stated, the media manager 106 dynamically selects media content to output on the display devices 105 of a given retail establishment. Generally, the media manager 106 may detect the presence of one or more user devices 102 in the retail establishment (e.g., via wireless signals, facial recognition, and the like). The media manager 106 may identify user devices 102 that of users have previously agreed to participate in sharing information with the media manager 106. The media manager 106 may then receive data describing the user of the user devices 102, such as the profile data in the user profiles 110, data from the applications 109, and data from the biometric sensors 111. In response, the media manager 106 is able to tailor multimedia content to one or more of the detected users. For example, a rule in the rules 108 may include an indication that user X has scheduled the playback of a video for user Y at a predefined time. If the media manager 106 detects the presence of user X and/or user Y (and/or the user devices 102 of users X and/or Y), the media manager 106 may output the video on one or more display devices 105 at the predefined time. The video may be stored in any instance of the stored media 107 (e.g., submitted by users X, Y) and/or received from the remote data sources 103 (e.g., a live video from the user Y's favorite attraction at a theme park). Furthermore, the media manager 106 may modify the content outputted on the display devices 105. For example, the media manager 106 may overlay an image of user Y on the video, output a live video of user Y in the store in a split-screen arrangement on the display device 105, add clothing or other objects to an image and/or video of user Y, and the like. Furthermore, the media manager 106 may enrich the user profile 110 of one or more users. For example, if user Y purchases a hat in the retail establishment, the media manager 106 may add the hat to the clothing of user Y's avatar for a gaming application 109, and update the user profile 110 for the avatar accordingly.

Figure 2A:
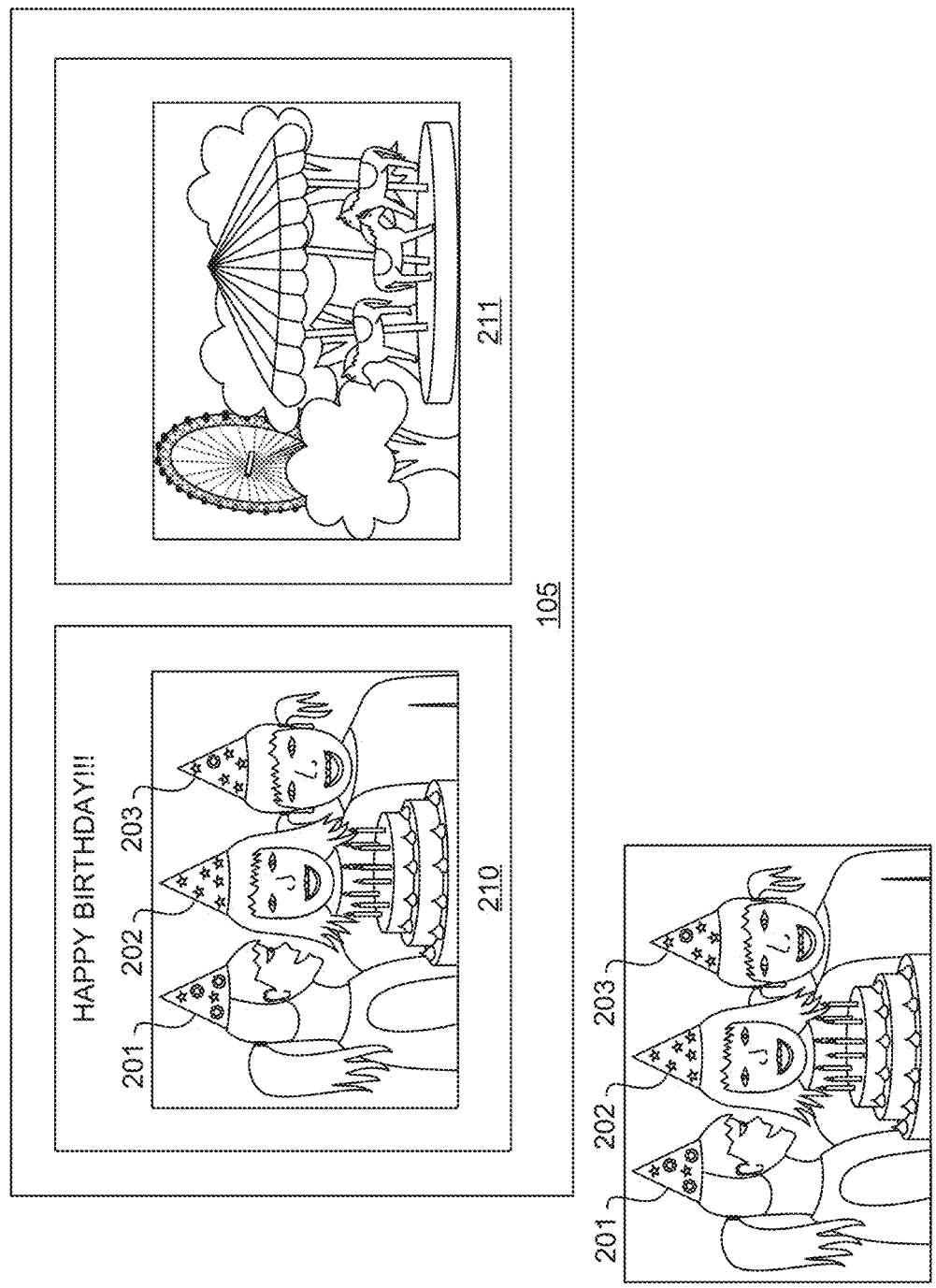
FIGS. 2A-2E illustrate examples of dynamic media content for in-store experiences, according to various embodiments.

FIG. 2A illustrates an example of dynamic media content outputted on a display device 105 for in-store experiences, according to one embodiment. As shown, the three users 201-203 are depicted as participating in a birthday party at a retail establishment including the display device 105. The media manager 106 may detect the users 201-203 (e.g., via a device 102, facial recognition, etc.), and cause one or more of the cameras 104 to capture video of the birthday party in the store. The media manager 106 may then output the video captured by the cameras 104 as the video 210 on the display 105. As shown, the media manager 106 has also overlaid a text greeting of "happy birthday" on the video 210 of the birthday party. Furthermore, the media manager 106 has selected a video 211 to output on the display 105 with the video 210 of the birthday party. In this example, the video 211 is a live video from one of the remote data sources 103, which corresponds to a favorite attraction of one of the users 201-203. The favorite attraction may be stored as a setting in the corresponding user profile 110, allowing the media manager 106 to identify the most appropriate content to display for the users 201-203. As the video 211 continues to play, the video 210 includes the reactions of the users 201-203 to the video 211. As such, the media manager 106 may save a copy of the video 210 for later use.

Figure 2B:
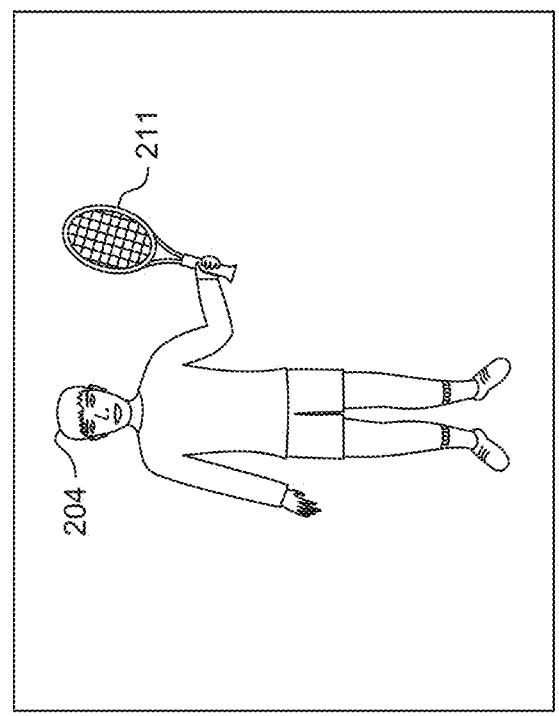
Figure 2B:
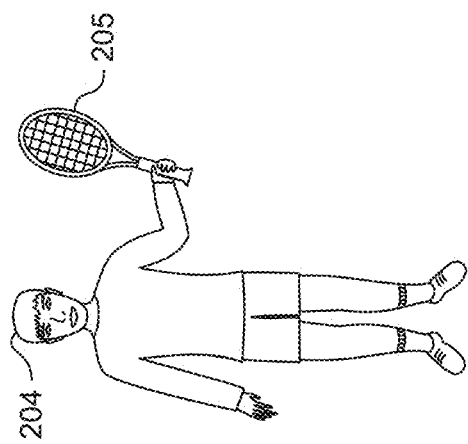

FIG. 2B illustrates an example of dynamic media content outputted on a display device 105 for in-store experiences, according to one embodiment. As shown, a user 204 is interacting with a tennis racket 205 in a retail store. The cameras 104 (not pictured) may capture video of the user 204 interacting with the tennis racket 205. As such, the media manager 106 may analyze the image data provided by the camera 104 to identify the user 204 (e.g., via facial recognition) and the tennis racket 205 (e.g., via object recognition). The media manager 106 may further detect a user device 102 of the user 204, and receive user profile data 110 and biometric data captured by the biometric sensors 111 from the user device 102. The user profile data may specify that the user 204 is a fan of tennis, and the data provided by the biometric sensors 111 may reflect that the user 204 is excited while holding the tennis racket 205.

Based on the received data and/or one or more rules 108, the media manager 106 may output a video 220 of the user 204 which depicts the user 204 holding a tennis racket 211, which may be a digitized version of the tennis racket 205. The media manager 106 may further output sounds associated with tennis, such as sounds from a tennis match, while the video 220 of the user 204 is outputted on the display 105. Furthermore, the media manager 106 may leverage motion detection to track the real-life movements of the user 204 in the retail store. In doing so, the user 204 depicted in the video 220 mimics the detected real-life motions of the user 204, further engaging the user.

Figure 2C:
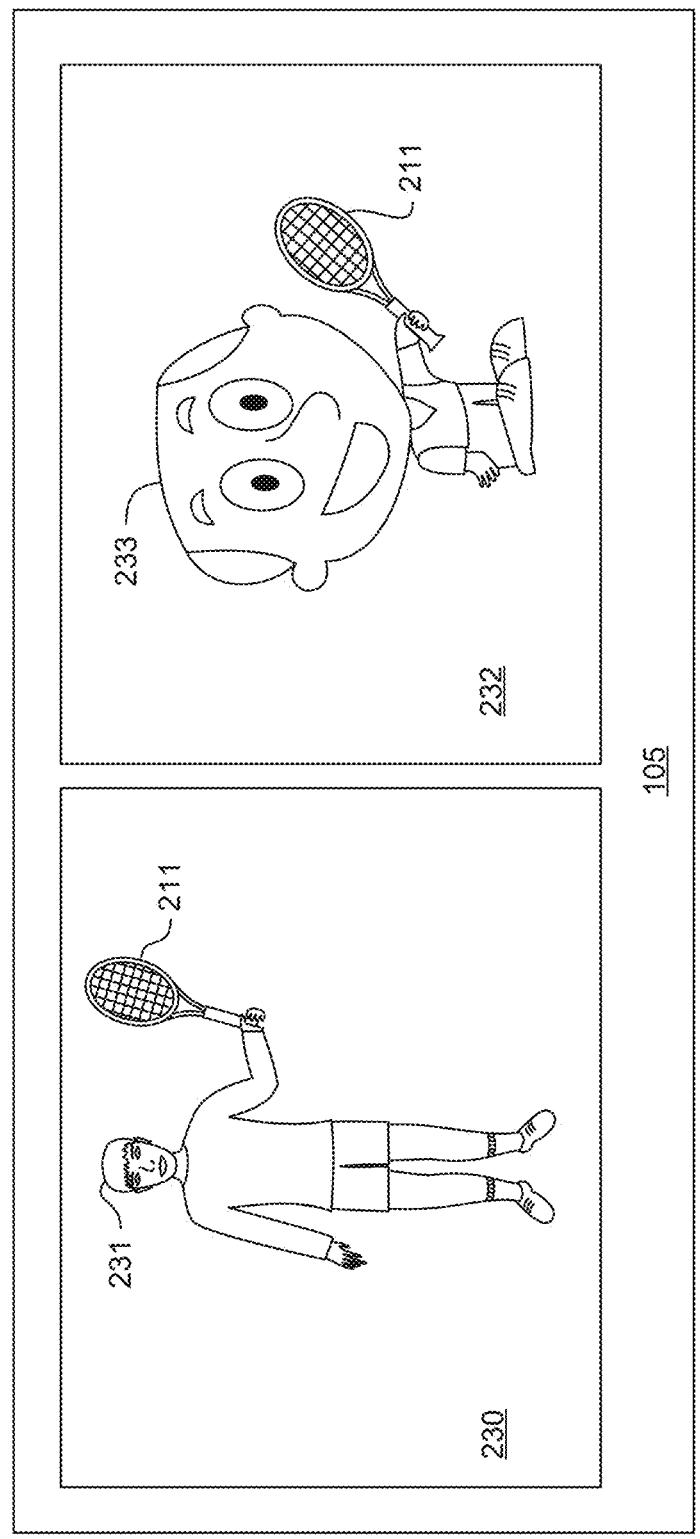

FIG. 2C illustrates an example of dynamic media content outputted on a display device 105 for in-store experiences, according to one embodiment. FIG. 2C depicts an embodiment where a digital version 231 (e.g., a computer-generated version) of the user 204 of FIG. 2B is created and outputted as part of a video 230 on the display 105. Again, the media manager 106 may detect the motions of the user 204, and cause the digital version 231 of the user in the video 230 to mimic the real-life motions of the user 204. Furthermore, as shown, the media manager 106 depicts the digital version 231 of the user 204 as holding the computer-generated tennis racket 211. Further still, as shown, the media manager 106 outputs a second video 232, which includes an avatar 233 of the user. The avatar 233 may be retrieved from the user's account for a given application 109 (e.g., in the profile data 110). As shown, the avatar 233 is also depicted as holding the tennis racket 211. In at least one embodiment, the media manager 106 modifies the user profile 110 to depict that the avatar now is equipped with the tennis racket 211.

Figure 2D:
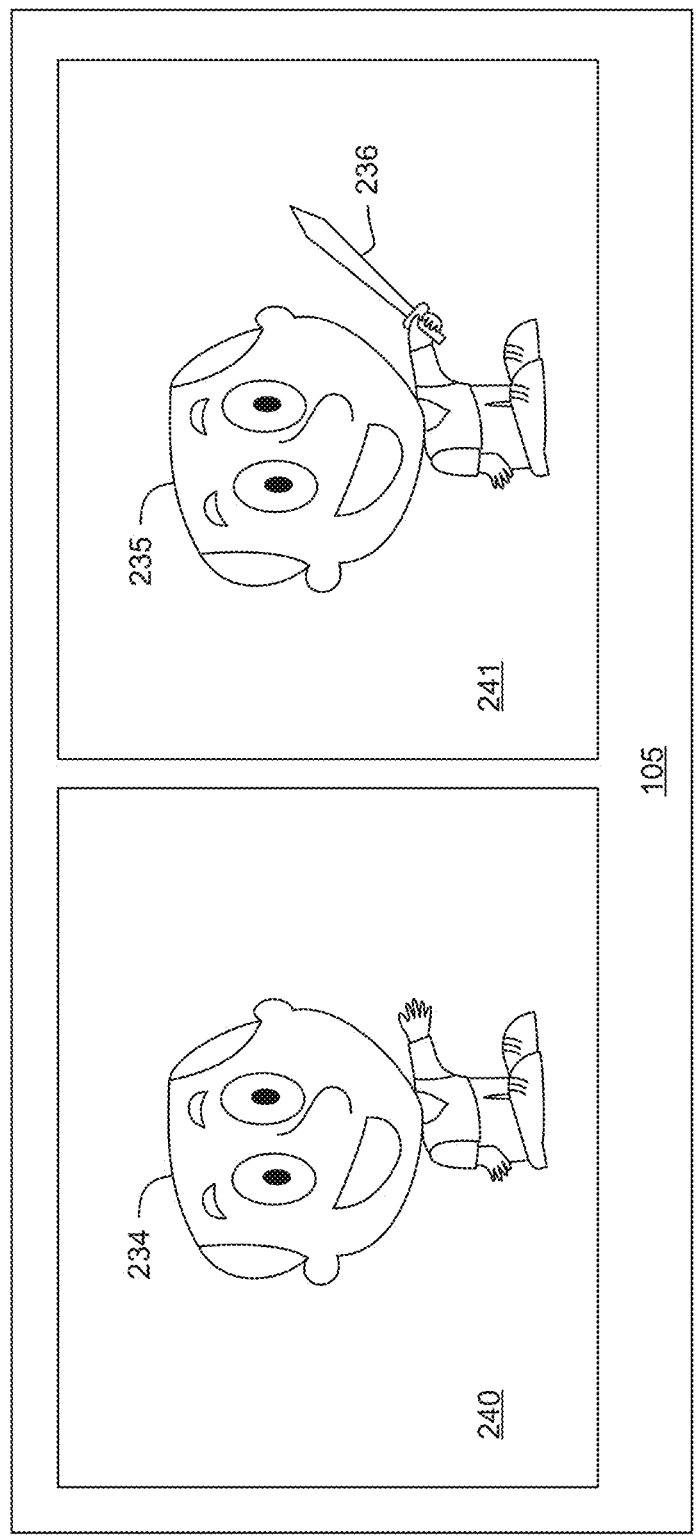

FIG. 2D illustrates an example of dynamic media content outputted on a display device 105 for in-store experiences, according to one embodiment. As shown, an avatar 234 of a user detected in proximity of the display 105 is outputted in a first panel 240 on the display device 105. The avatar 234 may be retrieved from the user profile 110 of the user, or any other source. In at least one embodiment, the media manager 106 may modify the avatar 234. For example, the media manager 106 may modify the avatar 234 to look more like the user 204. To do so, the media manager 106 may compare a captured image of the user 204, identify one or more visual features of the user, and modify the avatar 233 based on the identified features to create the modified avatar 235. The media manager 106 may then output the modified avatar 235 in video panel 241. As shown, the media manager 106 has further enhanced the modified avatar 235 by depicting the avatar 241 as holding an example object 236. In at least one embodiment, the example object 236 corresponds to an object the user has purchased or has otherwise interacted with in the retail store. In at least one embodiment, the media manager 106 stores the modified avatar 235 in the user profile 110 of the user.

Figure 2E:
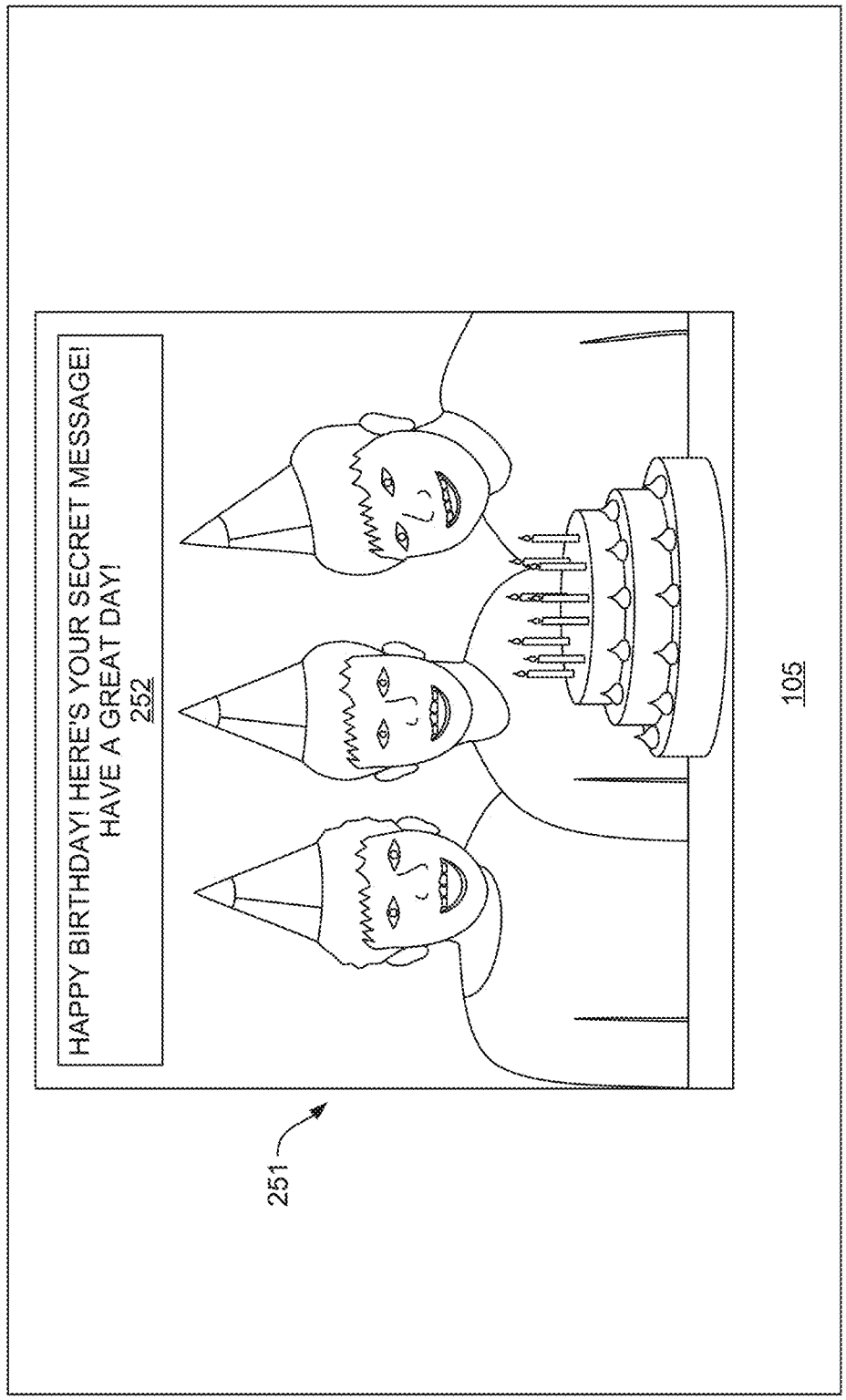

FIG. 2E illustrates an example of dynamic media content outputted on a display device 105 for in-store experiences, according to one embodiment. As shown, the display 105 outputs a video 251 which depicts three users 206-208 attending a birthday party at home. The video 251 may be a video from the remote data sources 103, e.g., pre-recorded video of the birthday party including the users 206-208. As part of enhancing the user experience, the media manager 106 may overlay a message 252 on the video 251. In at least one embodiment, message 252 is a "hidden" message in that the message 252 appears for a very limited time (e.g., a single frame of video). To allow the user to capture their special moment in the retail store, the media manager 106 may communicate with the user device 102 of one or more users, allowing a camera of the user device 102 to capture an image of the display 105 that includes the hidden message 252. To do so, in one embodiment, the media manager 106 may provide the user device 102 with an indication of a time when the hidden message 252 will be displayed. The camera of the user device 102 may then capture the image at the specified time, and store the image in the stored media 107. As another example, the media manager 106 may provide the user device 102 with polarization or color parameters associated with the hidden message 252. The user device 102 may then modify parameters of the camera (e.g., polarization and/or color parameters) to capture an image and/or video that visibly includes the hidden message 252.

As previously indicated, the cameras 104 may continue to capture images and/or video of the users in the retail store. Therefore, the media manager 106 may create a new video, which includes the pre-recorded video 251 (e.g., of the birthday party) as well as the video captured by the cameras 104, which depicts the users watching the pre-recorded video 251 in the retail store.

Figure 3:
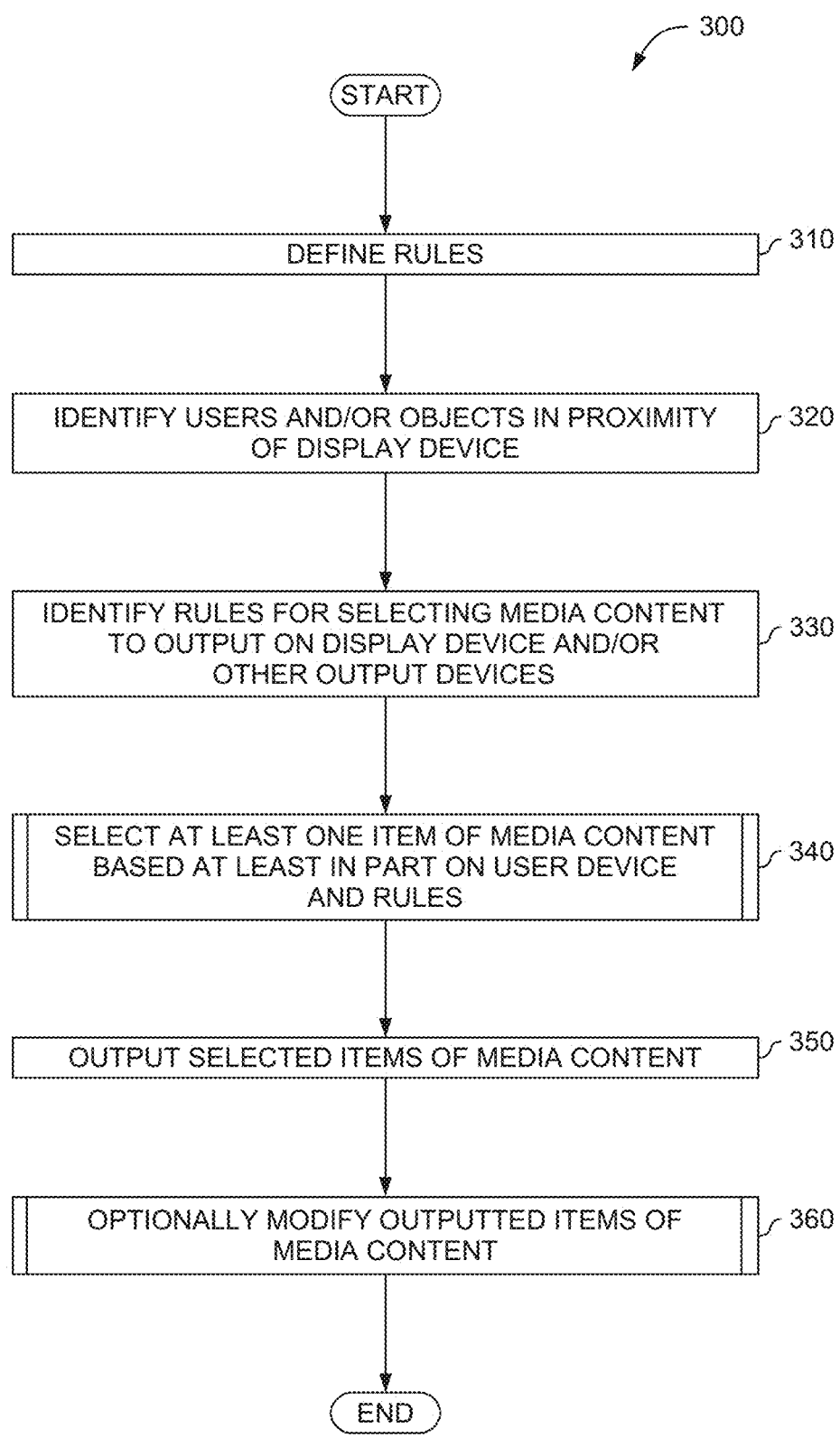
FIG. 3 is a flow chart illustrating a method for providing dynamic media content for in-store experiences, according to one embodiment.

FIG. 3 is a flow chart illustrating a method 300 for providing dynamic media content for in-store experiences, according to one embodiment. As shown, the method 300 begins at block 310, where one or more rules in the rules 108 are defined. As previously indicated, the rules 108 include predefined and/or user-defined rules related to selecting, modifying, and outputting content on the display devices 105. Therefore, for example, a system administrator may define a rule specifying to output video of a user's favorite cartoon character when the user's pulse rate is below a specified threshold. At block 320, the media manager 106 identifies users and/or objects in proximity of a display device 105. For example, using wireless communications, the media manager 106 may identify the smartphone 102 of a user. As another example, the media manager 106 may perform facial recognition on an image of the user captured by the cameras 104 to identify the user. Similarly, the media manager 106 may use object recognition technology to identify an object held by the user (or an object in proximity of the user), such as a toy doll being sold in the retail store.

At block 330, the media manager 106 identifies rules in the rules 108 selecting media content to output on the display device 105. Generally, the media manager 106 considers attributes in the user profile 110 of the user (e.g., preferences), biometric data received from the user device 102 of the user, and the identified objects in proximity of the user when identifying the relevant rules 108. The media manager 106 may also consider schedules of events, e.g., a local birthday party, remote parade, sporting events, concerts, and the like. At block 340, the media manager 106 selects at least one item of media content based on the data received from the user device 102, the user profile data 110, and the rules identified at block 330. For example, if the media manager 106 detects the user holding the toy doll, the media manager 106 may select a video including the character associated with the toy doll. The media manager 106 may also select the video based on the user profile 110 of the detected user specifying the character is the user's favorite character. As previously indicated, the content may be user-provided, stored locally, and or received from the remote data sources 103 (e.g., a live video).

At block 350, the media manager 106 outputs the items of media content selected at block 340. Generally, the media manager 106 outputs images, video, and/or audio selected at block 340. At block 360, described in greater detail with reference to FIG. 5, the media manager 106 optionally modifies the items of media content outputted at block 350. For example, the media manager 106 may overlay a message to the user, output an image and/or video of the user captured by the cameras 104, add an additional media source (e.g., a live video from the remote data sources 103), and the like. More generally, the media manager 106 continuously monitors users and/or devices in proximity of each display device 105 in the retail store. Doing so allows the media manager 106 to identify relevant media content to output on the display devices 105.

Figure 4:
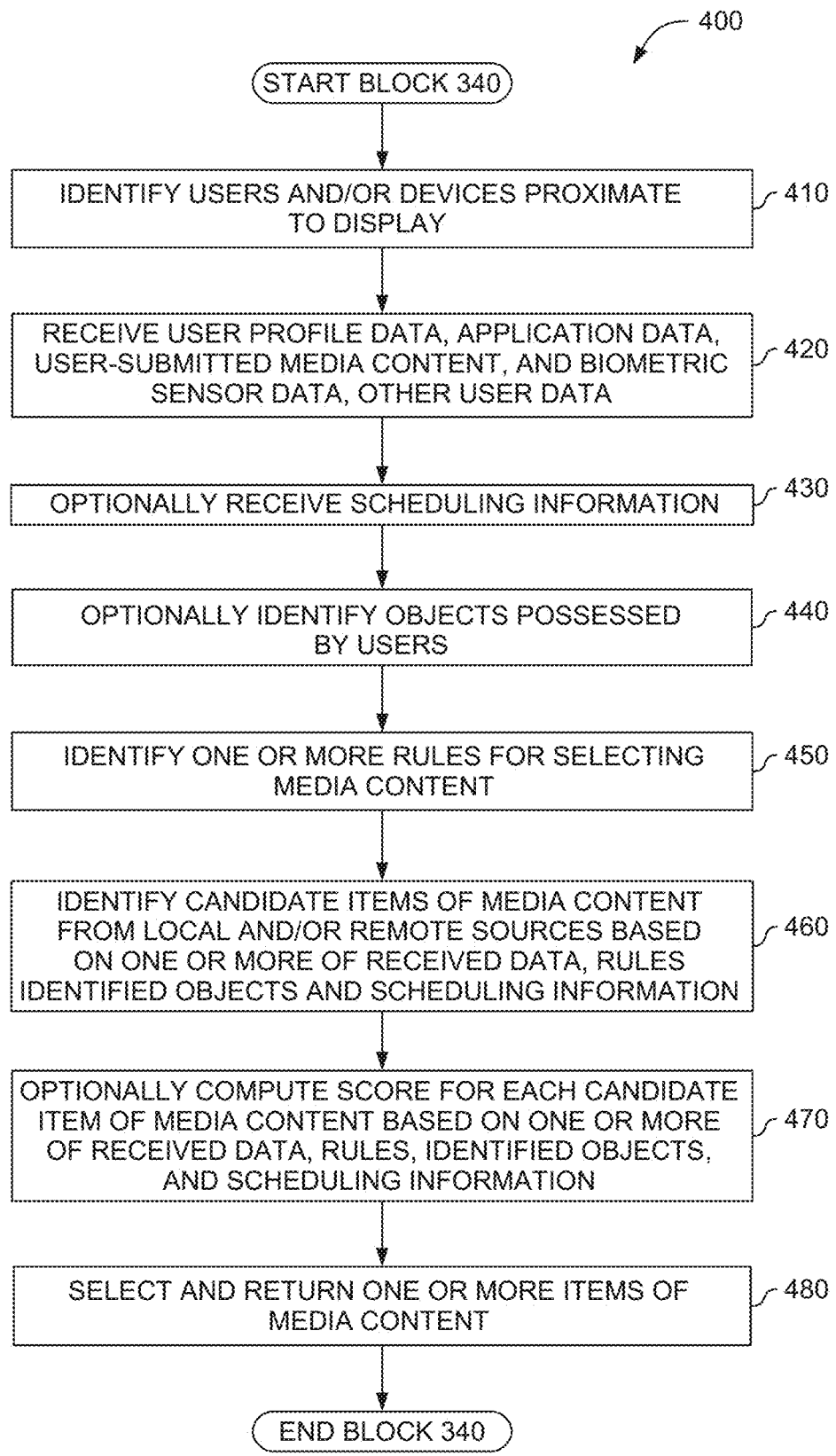
FIG. 4 is a flow chart illustrating a method to select items of media content, according to one embodiment.

FIG. 4 is a flow chart illustrating a method 400 corresponding to block 340 to select items of media content, according to one embodiment. As shown, the method 400 begins at block 410, where the media manager 106 identifies users and/or user devices 102 proximate to a given display device 105. As previously indicated, the media manager 106 uses wireless data communications to identify user devices 102. The media manager 106 may use facial recognition algorithms applied to image data captured by the cameras 104 to identify users. Additionally and/or alternatively, the media manager 106 may identify users based on the user profile data received from the user devices 110 (e.g., by identifying account information for the user). At block 420, the media manager 106 receives data from the user device 102 and/or the instance of the user profiles 110 stored in the server 101. Generally, the received data includes biometric data from the biometric sensors 111, user profile data, data describing the applications 109 on the user devices 102, media content (e.g., from the user devices 102 and/or the remote data sources 103), and any other type of user data.

At block 430, the media manager 106 optionally receives scheduling information, such as scheduled parties in the retail store, as well as remote events for which the data sources 103 provide media content (e.g., video conferenced birthday parties). At block 440, the media manager 106 optionally identifies objects possessed by the users within proximity of the display devices 105. For example, a user may be wearing a t-shirt and helmet that are for sale in the retail establishment. The media manager 106 may generally use image data provided by the cameras 104 to perform object recognition to identify the objects. At block 450, the media manager 106 references the rules 108 for selecting content. Generally, the rules 108 may include associations between one or more of user profile parameters, biometric data, event scheduling, detected event types (both in-store and remote), and a type of media content (e.g., a birthday-themed video for a birthday party).

At block 460, the media manager 106 identifies a plurality of candidate items of media content from local and/or remote sources based on the identified rules. For example, the media manager 106 may identify metadata of videos, images, and/or songs in the stored media 107 and/or remote data sources 103 indicating that the videos, images, and/or songs are related to birthdays. At block 470, the media manager 106 optionally computes a score for each candidate item of media content identified at block 460. Generally, the media manager 106 may use any suitable scoring algorithm to compute a score for each candidate item of media content, where the score reflects a relevance in light of the users in the store, the events occurring in the store (and/or remotely), the user preferences, and any other type of user data. At block 480, the media manager 106 selects and returns at least one item of media content.

Figure 5:
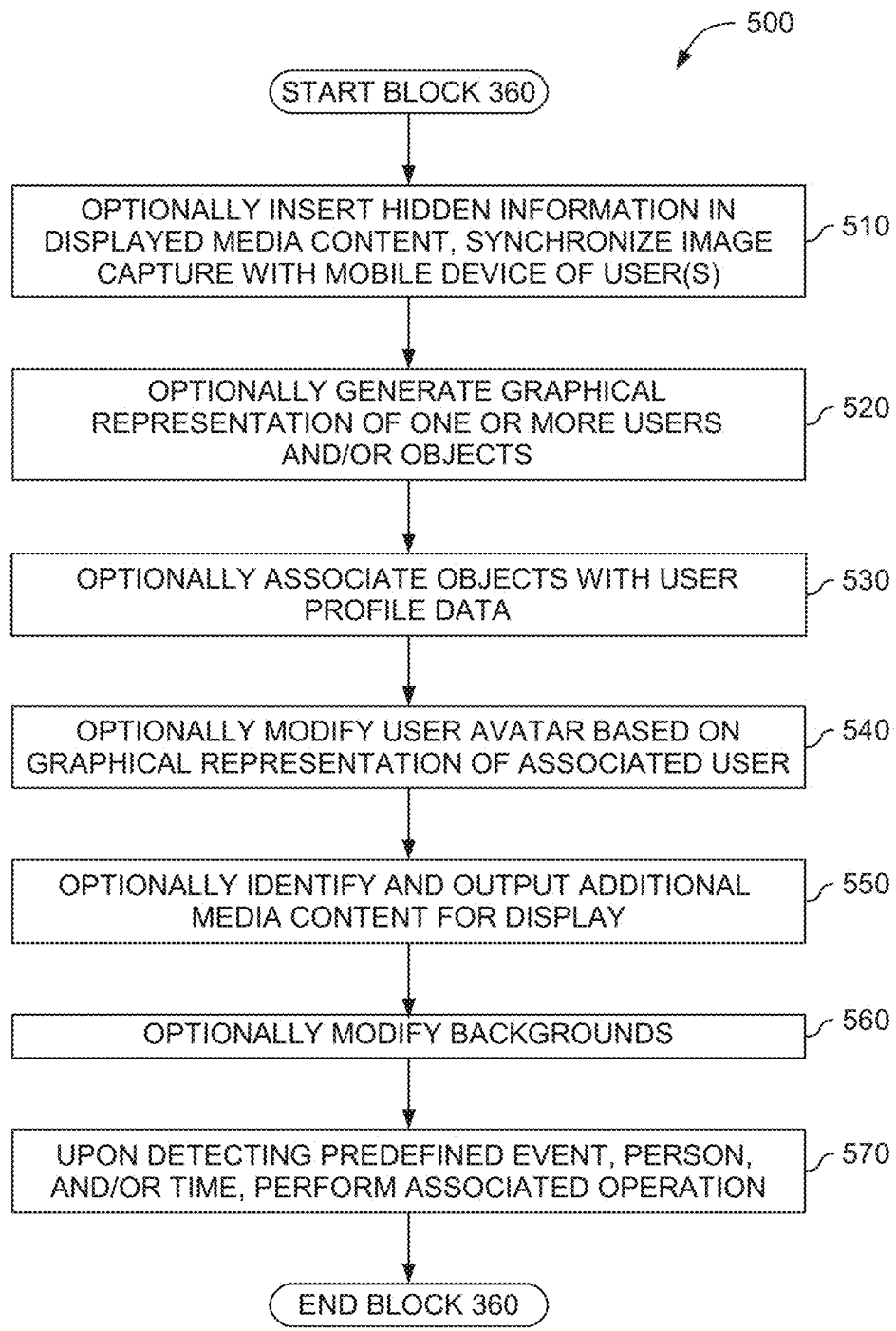
FIG. 5 is a flow chart illustrating a method to modify items of media content, according to one embodiment.

FIG. 5 is a flow chart illustrating a method 500 corresponding to block 360 to modify items of media content, according to one embodiment. As shown, the method 500 begins at block 510, where the media manager 106 optionally inserts hidden information in media content outputted on the display 105. For example, the media manager 106 may overlay the birthday message 252 on the video 251 of FIG. 2E. The media manager 106 may then communicate with the user devices 102 of each associated user to allow the user device 102 to capture an image of the hidden message. At block 520, the media manager 106 optionally generates a graphical representation of a user and/or an object possessed by the user. For example, the media manager 106 may render an animated version of the user and any objects the user is holding. The media manager 106 may then output the animated version of the user and objects on the display 105.

At block 530, the media manager 106 may optionally associate objects with the user profile 110 of a user. For example, the media manager 106 may associate the user with the game of basketball based on the user purchasing a basketball in the retail store. At block 540, the media manager 106 may optionally modify the avatar of the user based on the graphical representation of the user generated at block 520. Doing so creates a "look alike" version of the avatar for the user. The media manager 106 may also modify the avatar of the user based on objects the user is interacting with in the retail store. For example, if the user is wearing a helmet, the media manager 106 may add a graphically generated version of the helmet to the user's avatar for an application 109.

At block 550, the media manager 106 optionally identifies and outputs additional media content for display. For example, during a birthday party, the media manager 106 may identify a video including the user's favorite characters singing happy birthday. The media manager 106 may then output the video on the display 105 during the birthday party. At block 560, the media manager 106 may optionally modify a background image outputted on the display 105. For example, the media manager 106 may output an image of a child during the child's birthday party. At block 570, the media manager 106 may detect an event, person, and/or time that is associated with an operation in the rules 108. In response, the media manager 106 performs the predefined operation. For example, if user X's birthday party is scheduled for 2:00 PM in the retail store, the media manager 106 may monitor the image data provided by the cameras 104 to detect the presence of user X. Once user X arrives, the media manager 106 determines to output music and videos to welcome user X to their birthday party. The media manager 106 may also initiate remote communications with other devices. Doing so allows remote users to participate in events occurring in the retail store, such as user X's birthday party.

Figure 6:
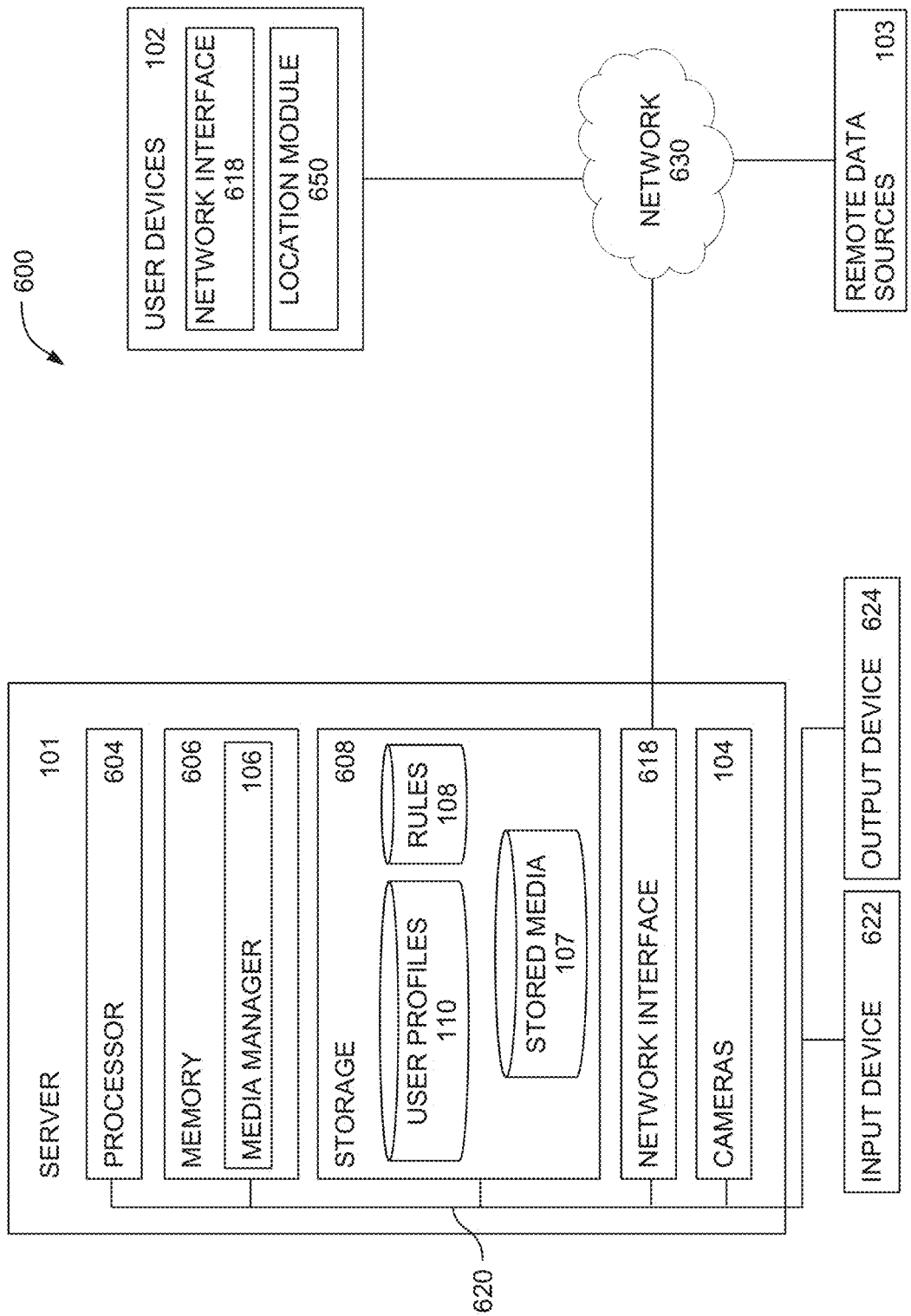
FIG. 6 is a block diagram illustrating a system which provides dynamic media content for in-store experiences, according to one embodiment.

FIG. 6 is a block diagram illustrating a system 600 which provides dynamic media content for in-store experiences, according to one embodiment. The networked system 600 includes the server 101. The server 101 may also be connected to other computers such as the user devices 102 and the remote data sources 103 via a network 630. In general, the network 630 may be a telecommunications network and/or a wide area network (WAN). In a particular embodiment, the network 630 is the Internet.

The server 101 generally includes a processor 604 which obtains instructions and data via a bus 620 from a memory 606 and/or a storage 608. The server 101 may also include one or more network interface devices 618, input devices 622, and output devices 624 connected to the bus 620. The server 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the server 101 to communicate with other computers via the network 630.

The storage 608 is representative of hard-disk drives, solid state drives, flash memory devices, optical media and the like. Generally, the storage 608 stores application programs and data for use by the server 101. In addition, the memory 606 and the storage 608 may be considered to include memory physically located elsewhere; for example, on another computer coupled to the server 101 via the bus 620.

The input device 622 may be any device for providing input to the server 101. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the server 101. The output device 624 may include output devices such as monitors, touch screen displays, and so on.

As shown, the memory 606 contains the media manager 106. As shown, the storage 608 contains the stored media 107, rules 108, and user profiles 110. As shown, the user devices 102 also include an instance of a network interface 618. The user devices 102 further include a location module 650. The location module 650 corresponds to a module which allows the location of a given user device 102 to be determined. One example of a location module 650 includes a global positioning system (GPS) module.

In the foregoing, reference is made to embodiments of the disclosure. However, it should be understood that the disclosure is not limited to specific described embodiments. Instead, any combination of the recited features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the media manager 106 could execute on a computing system in the cloud and output relevant media content in retail locations around the world. In such a case, the media manager 106 could modify the user profiles and/or avatars of users and store updated profiles and avatars at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   detecting, by a first computing system, a first mobile device within a predefined proximity of a display device;
   receiving profile data from the first mobile device;
   identifying at least one rule for selecting media content based on the profile data;
   selecting, based on the at least one rule applied to the profile data, a first item of media content of a plurality of items of media content;
   modifying the first item of media content to include a hidden message;
   determining a future moment in time when the hidden message will be displayed on the display device, wherein the hidden message will only be displayed for a single frame at the future moment in time and will not be displayed during other frames at other moments in time;
   transmitting, to the first mobile device, an indication of the determined future moment in time and an indication that the hidden message will only be displayed at the future moment in time;
   outputting, at the determined future moment in time, the first item of media content for display on the display device, wherein the display device outputs the hidden message only at the future moment in time and for only the single frame;
   causing the first mobile device to capture an image including the display device at the determined future moment in time, such that the image includes the hidden message;
   identifying an avatar associated with a user of the first mobile device;
   modifying the avatar based on captured image data of the user of the first mobile device, comprising:
      modifying the avatar to include at least one facial feature of the user;
      detecting a first object that was purchased by the user in a retail environment, wherein the display device is in the retail environment; and
      modifying the avatar to include the first object;
   outputting the modified avatar on the display device at least at the future moment in time; and
   storing the modified avatar in a user profile of the user of the first mobile device for future use.

2. The method of claim 1, wherein the profile data specifies: (i) a set of user preferences, (ii) a set of applications stored on the first mobile device, (iii) a user account for each application in the set of applications, and (iv) biometric data captured by biometric sensors of the first mobile device, wherein the plurality of items of media content comprise: (i) live media content, (ii) locally stored media content, (iii) remotely stored media content, (iv) user-submitted media content, and (v) user-submitted media content.

3. The method of claim 2, further comprising:
   capturing, by the first computing system, image data of the user of the first mobile device;
   identifying second object in a hand of the user of the first mobile device;
   generating a graphical representation of the user and a graphical representation of the second object; and
   outputting the generated graphical representations of the user and the second object for display on the display device.

4. The method of claim 3, wherein the profile data comprises the user profile of the user of the first mobile device, the method further comprising:
   associating by the first computing system, the object with the user profile of the user of the first mobile device.

5. The method of claim 4, wherein the single frame when the hidden message is displayed is of a plurality of frames of a video, wherein all frames of the plurality of frames other than the single frame do not include the hidden message, and wherein the single frame is displayed at the future moment in time.

6. The method of claim 5, wherein the first item of media content is further selected based on a respective score computed for each of the plurality of items of media content, wherein each score is computed based at least in part on the profile data, the biometric data, and the user account for each application.

7. A computer program product, comprising:
a non-transitory computer-readable storage medium having computer-readable program code embodied therewith, the computer-readable program code executable by a processor to perform an operation comprising:
detecting, by a first computing system, a first mobile device within a predefined proximity of a display device;
receiving profile data from the first mobile device;
identifying at least one rule for selecting media content based on the profile data;
selecting, based on the at least one rule applied to the profile data, a first item of media content of a plurality of items of media content;
modifying the first item of media content to include a hidden message;
determining a future moment in time when the hidden message will be displayed on the display device, wherein the hidden message will only be displayed for a single frame at the future moment in time and will not be displayed during other frames at other moments in time;
transmitting, to the first mobile device, an indication of the determined future moment in time and an indication that the hidden message will only be displayed at the future moment in time;
outputting, at the determined future moment in time, the first item of media content for display on the display device, wherein the display device outputs the hidden message only at the future moment in time and for only the single frame;
causing the first mobile device to capture an image including the display device at the determined future moment in time, such that the image includes the hidden message;
identifying an avatar associated with a user of the first mobile device;
modifying the avatar based on captured image data of the user of the first mobile device, comprising:
modifying the avatar to include at least one facial feature of the user;
detecting a first object that was purchased by the user in a retail environment, wherein the display device is in the retail environment; and
modifying the avatar to include the first object;
outputting the modified avatar on the display device at least at the future moment in time; and
storing the modified avatar in a user profile of the user of the first mobile device for future use.

8. The computer program product of claim 7, wherein the profile data specifies: (i) a set of user preferences, (ii) a set of applications stored on the first mobile device, (iii) a user account for each application in the set of applications, and (iv) biometric data captured by biometric sensors of the first mobile device, wherein the plurality of items of media content comprise: (i) live media content, (ii) locally stored media content, (iii) remotely stored media content, (iv) user-submitted media content, and (v) user-submitted media content.

9. The computer program product of claim 8, the operation further comprising:
capturing, by the first computing system, image data of the user of the first mobile device;
identifying second object in a hand of the user of the first mobile device;
generating a graphical representation of the user and a graphical representation of the second object; and
outputting the generated graphical representations of the user and the second object for display on the display device.

10. The computer program product of claim 9, wherein the profile data comprises the user profile of the user of the first mobile device, the operation further comprising:
associating by the first computing system, the object with the user profile of the user of the first mobile device.

11. The computer program product of claim 10, wherein the single frame when the hidden message is displayed is of a plurality of frames of a video, wherein all frames of the plurality of frames other than the single frame do not include the hidden message, and wherein the single frame is displayed at the future moment in time.

12. The computer program product of claim 11, wherein the first item of media content is further selected based on a respective score computed for each of the plurality of items of media content, wherein each score is computed based at least in part on the profile data, the biometric data, and the user account for each application.

13. A system, comprising:
one or more computer processors; and
a memory containing a program which when executed by the processors performs an operation comprising:
detecting, by a first computing system, a first mobile device within a predefined proximity of a display device;
receiving profile data from the first mobile device;
identifying at least one rule for selecting media content based on the profile data;
selecting, based on the at least one rule applied to the profile data, a first item of media content of a plurality of items of media content;
modifying the first item of media content to include a hidden message;
determining a future moment in time when the hidden message will be displayed on the display device, wherein the hidden message will only be displayed for a single frame at the future moment in time and will not be displayed during other frames at other moments in time;
transmitting, to the first mobile device, an indication of the determined future moment in time and an indication that the hidden message will only be displayed at the future moment in time;
outputting, at the determined future moment in time, the first item of media content for display on the display device, wherein the display device outputs the hidden message only at the future moment in time and for only the single frame;
causing the first mobile device to capture an image including the display device at the determined future moment in time, such that the image includes the hidden message;
identifying an avatar associated with a user of the first mobile device;

modifying the avatar based on captured image data of the user of the first mobile device, comprising:
    modifying the avatar to include at least one facial feature of the user;
    detecting a first object that was purchased by the user in a retail environment, wherein the display device is in the retail environment; and
    modifying the avatar to include the first object;
outputting the modified avatar on the display device at least at the future moment in time; and
storing the modified avatar in a user profile of the user of the first mobile device for future use.

14. The system of claim 13, wherein the profile data specifies: (i) a set of user preferences, (ii) a set of applications stored on the first mobile device, (iii) a user account for each application in the set of applications, and (iv) biometric data captured by biometric sensors of the first mobile device, wherein the plurality of items of media content comprise: (i) live media content, (ii) locally stored media content, (iii) remotely stored media content, (iv) user-submitted media content, and (v) user-submitted media content.

15. The system of claim 14, the operation further comprising:
    capturing, by the first computing system, image data of the user of the first mobile device;
    identifying second object in a hand of the user of the first mobile device;
    generating a graphical representation of the user and a graphical representation of the second object; and
    outputting the generated graphical representations of the user and the second object for display on the display device.

16. The system of claim 15, wherein the profile data comprises the user profile of the user of the first mobile device, the operation further comprising:
    associating by the first computing system, the object with the user profile of the user of the first mobile device.

17. The system of claim 16, wherein the single frame when the hidden message is displayed is of a plurality of frames of a video, wherein all frames of the plurality of frames other than the single frame do not include the hidden message, and wherein the single frame is displayed at the future moment in time.

18. The system of claim 17, wherein the first item of media content is further selected based on a respective score computed for each of the plurality of items of media content, wherein each score is computed based at least in part on the profile data, the biometric data, and the user account for each application.

* * * * *